(12) United States Patent
Giese

(10) Patent No.: US 7,234,719 B2
(45) Date of Patent: Jun. 26, 2007

(54) BICYCLE TOWING DEVICE

(75) Inventor: Curtis Frederick Giese, 17157 Buttonwood St., Fountain Valley, CA (US) 92708

(73) Assignee: Curtis Frederick Giese, Fountain Valley, CA (US)

( * ) Notice: Subject to any disclaimer, the term of this patent is extended or adjusted under 35 U.S.C. 154(b) by 0 days.

(21) Appl. No.: 10/550,830

(22) PCT Filed: Mar. 22, 2004

(86) PCT No.: PCT/US2004/008614

§ 371 (c)(1),
(2), (4) Date: Sep. 23, 2005

(87) PCT Pub. No.: WO2004/085234

PCT Pub. Date: Oct. 7, 2004

(65) Prior Publication Data

US 2006/0186634 A1 Aug. 24, 2006

Related U.S. Application Data

(60) Provisional application No. 60/456,727, filed on Mar. 24, 2003.

(51) Int. Cl.
*B62K 27/00* (2006.01)
(52) U.S. Cl. .................................................. 280/292
(58) Field of Classification Search ................ 280/204, 280/292, 498; 224/427, 425
See application file for complete search history.

(56) References Cited

U.S. PATENT DOCUMENTS

| 605,799 | A | * | 6/1898 | Ripley | 280/292 |
| 4,261,592 | A | * | 4/1981 | Busseuil | 280/292 |
| 5,641,173 | A | * | 6/1997 | Cobb, Jr. | 280/204 |
| 5,842,710 | A | * | 12/1998 | Couture | 280/204 |
| 6,155,582 | A | * | 12/2000 | Bourbeau | 280/204 |
| 6,286,847 | B1 | * | 9/2001 | Perrin | 280/204 |
| 6,983,947 | B2 | * | 1/2006 | Asbury et al. | 280/204 |

* cited by examiner

*Primary Examiner*—Tony Winner
(74) *Attorney, Agent, or Firm*—Paul, Hastings, Janofsky & Walker LLP

(57) ABSTRACT

A bicycle towing device for towing a trailing bicycle behind a leading bicycle including a leading bicycle connection interconnected to a trailing bicycle connection by a tow bar. The trailing bicycle connection is connectable to both upper and lower locations on the trailing bicycle such that the center of gravity of the force pulling the trailing bicycle is centered on the trailing bicycle to provide stable maneuverability of the trailing bicycle. The leading bicycle connection and the trailing bicycle connection include pivotal joints that allow limited degrees of rotational movement with respect to the tow bar. In this manner of attachment, the tow bar is pivotal with respect to both the leading bicycle connection and the trailing bicycle connection to account for differences in height between the bicycles while forcing the trailing bicycle to lean at substantially the same exact angle as the leading bicycle at all times.

19 Claims, 3 Drawing Sheets

BICYCLE TOWING DEVICE

BACKGROUND OF THE INVENTION

1. Technical Field

The subject invention relates generally to the field of bicycles, and, more particularly, to a device for towing a trailing bicycle behind a leading bicycle.

2. Description of Related Art

It has been known to link two bicycles together to tow a trailing bicycle behind a leading bicycle to form a sort of tandem bicycle arrangement. Such towing arrangements are particularly useful in teaching a child or another person how to ride a bicycle by attaching the child's bicycle to an adult's bicycle and simply towing the child's bicycle behind the riding adult. Such links usually involve attaching a rigid rod or frame between the seat mount member of the forward bicycle and a portion of the front frame of the trailing bicycle. The joined combination then allows the two bicycles to move in unison.

Many previous attempts at bicycle towing devices resulted in arrangements having poor overall maneuverability by providing too flexible of a connection between the bicycles or one that allows the trailing bicycle to steer its front wheel independently from the leading bicycle. Alternatively, too rigid of a connection between the bicycles by a bicycle towing device can cause the front wheel of the trailing bicycle to be lifted off the ground in an unsafe manner when the leading bicycle and the trailing bicycle are not traveling at the same height, such as when the two bikes pass over bumps or holes in the traveling surface.

SUMMARY

The following is a summary of various aspects and advantages realizable according to various embodiments of the bicycle towing device according to the present invention. It is provided as an introduction to assist those skilled in the art to more rapidly assimilate the detailed discussion of the invention that ensues and does not and is not intended in any way to limit the scope of the claims that are appended hereto.

The various embodiments described below relate to a bicycle towing device capable of simply, safely and stably towing a trailing bicycle behind a leading bicycle. The bicycle towing device includes a leading bicycle connection interconnected to a trailing bicycle connection by a tow bar. The trailing bicycle connection includes an upper frame connection member and a lower frame connection member being connectable to respective upper and lower locations on the trailing bicycle. By connecting to both upper and lower portions of the trailing bicycle, the center of gravity of the force pulling on the trailing bicycle is centered on the trailing bicycle to provide more stable maneuverability of the trailing bicycle. The connection to both upper and lower portions of the trailing bicycle further allows the bicycle towing device to provide greater control over the maneuvering of the trailing bicycle, ensuring that the trailing bicycle to maintained in a stable riding position that closely follows the movement of the leading bicycle.

The leading bicycle connection includes a clamp that is connectable to a rear portion of the frame of the leading bicycle, where connection to a seat post of the leading bicycle provides the highest degree of stability. The leading bicycle connection further includes a first arm extending from the clamp to a bi-directional joint that allows pivotal movement in only two pivotal directions. A second arm extends from the bi-directional joint on an opposite side of the bi-directional joint from the first arm, such that the first arm and second arm pivotal in two directions with respect to one another. The tow bar is connected on one of its ends to the second arm of the bi-directional joint and is further connected on its opposite end to a pivotal joint located on the trailing bicycle connection. The pivotal joint on the trailing bicycle connection is only pivotal in a rotational direction about a single rotational axis. In this manner of attachment, the tow bar is pivotal with respect to both the leading bicycle connection and the trailing bicycle connection to account for differences in height between the leading bicycle and the trailing bicycle. By having the tow bar and, in turn, the trailing bicycle connection being only pivotally with respect to the leading bicycle connection along the two rotational axes of the bi-directional joint, the trailing bicycle will be forced to lean at substantially the same exact angle as the leading bicycle at all times.

BRIEF DESCRIPTION OF THE DRAWINGS

The features of the present invention, which are believed to be novel, are set forth with particularity in the appended claims. The present invention, both as to its organization and manner of operation, together with further advantages, may best be understood by reference to the following description, taken in connection with the accompanying drawings in which the reference numerals designate like parts throughout the figures thereof and wherein:

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the general principles of the present invention have been defined herein specifically to provide a multi-purpose combined ladder/cart assembly.

Figure 1:
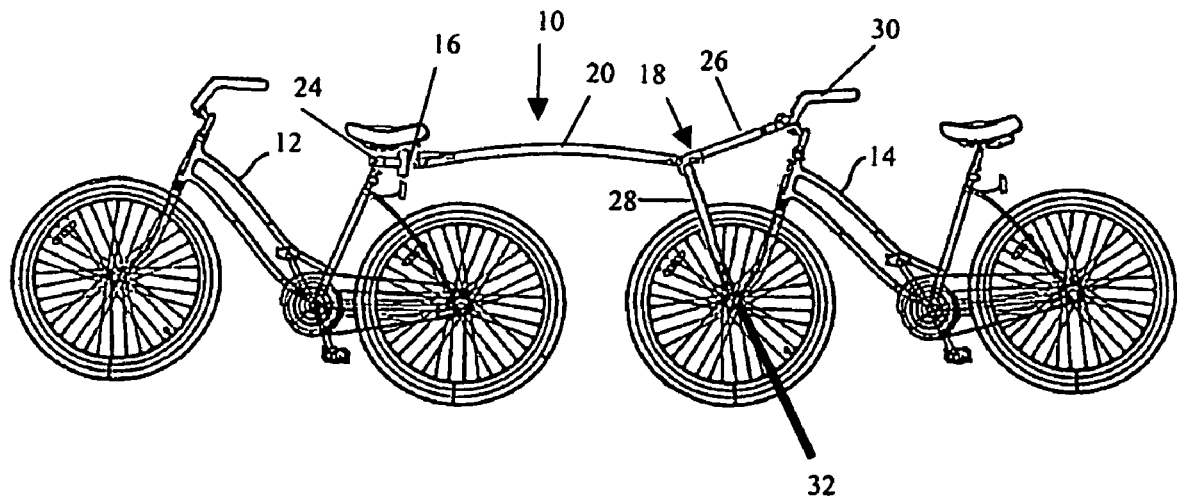
FIG. 1 is a side view of a preferred embodiment of the bicycle towing device attached between a leading bicycle and a trailing bicycle.

Referring to FIG. 1, a bicycle towing device 10 formed in accordance with a preferred embodiment is illustrated interconnecting a leading bicycle 12 with a trailing bicycle 14. The bicycle towing device 10 includes a leading bicycle connection 16 connectable to the leading bicycle 12 and a trailing bicycle connection 18 connectable to the trailing bicycle 14. A tow bar 20 connects the leading bicycle connection 16 to the trailing leading bicycle connection 18. In this manner of connection, the bicycle towing device 10 can be utilized to interconnect two bicycles to allow the trailing bicycle 14 to be towed behind the leading bicycle 12 or to form the two bicycles 12, 14 into a tandem bicycle arrangement. The towed arrangement can be particularly useful in towing a children's bicycle behind a parent's bicycle for the purpose of teaching a child how to ride a bicycle or to supervise a child while riding a bicycle, but it is the intention of the inventor of the present invention that the bicycle towing device 10 can be properly utilized on various sizes and types of bicycles for both the leading bicycle 12 and the trailing bicycle 14. Further, the bicycle towing device 10 allows a trailing bicycle 14 to be stably towed behind the leading bicycle 12 either with or without a passenger thereon.

Figure 2:
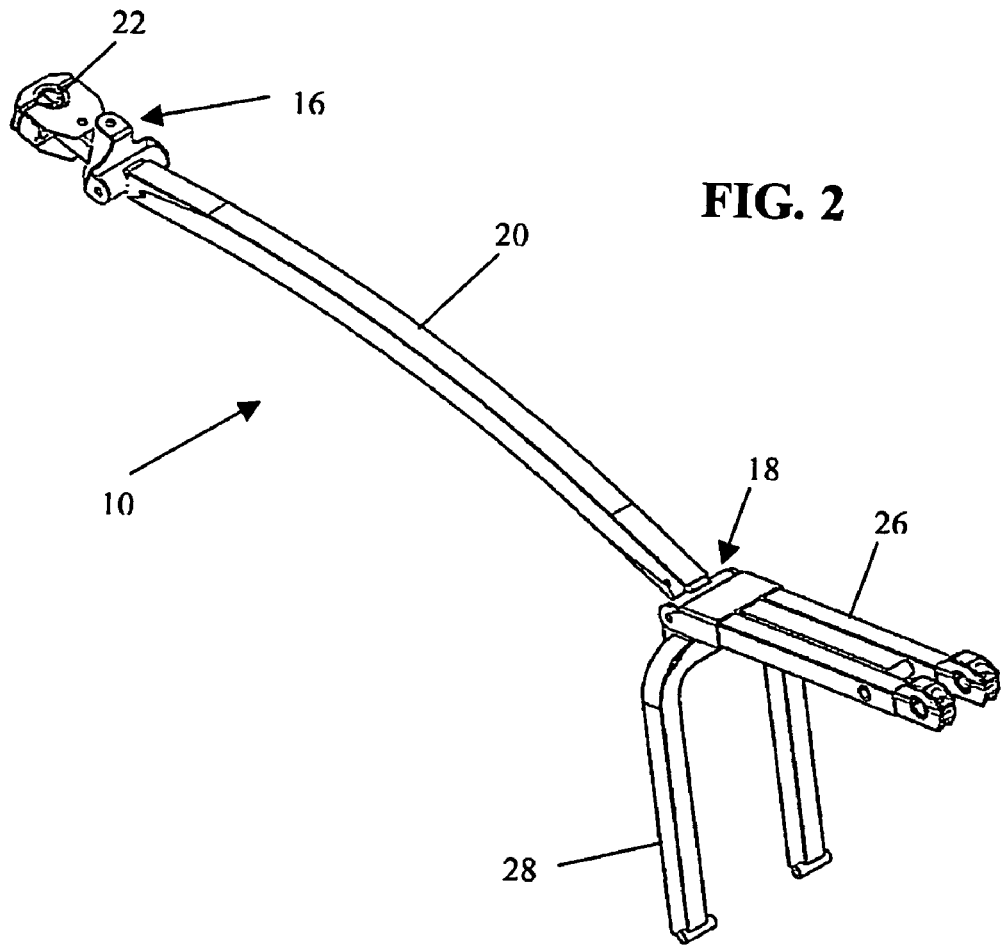
FIG. 2 is a perspective view of a preferred embodiment of the bicycle towing device.

With further reference to FIG. 2, a perspective view of the bicycle towing device 10 is illustrated in its unattached state. The leading bicycle connection 12 of the bicycle towing device 10 includes a clamp 22 that is connectable to a rear portion of the frame of the leading bicycle 12, where the clamp 22 is preferably connected to a seat post 24 of the leading bicycle to provide the highest degree of stability by centering the towing force directly beneath the rider of the leading bicycle 12. To connect to the trailing bicycle 14, the trailing bicycle connection 18 includes an upper frame connection member 26 and a lower frame connection member 28. The lower frame connection member 28 is connectable to a lower portion of the frame of the trailing bicycle 14, preferably at a lower end of the front fork 32 of the trailing bicycle 14. The upper frame connection member 26 is connected to the trailing bicycle 14 at a point above the connection point of the lower frame connection member 26, preferably connectable to a handlebar 30 of the trailing bicycle 14. It is understood that the upper frame connection member 26 may also be connectable of other locations on the upper portion of the trailing bicycle 14, such as the neck or upper frame of the trailing bicycle 14.

Figure 3A:
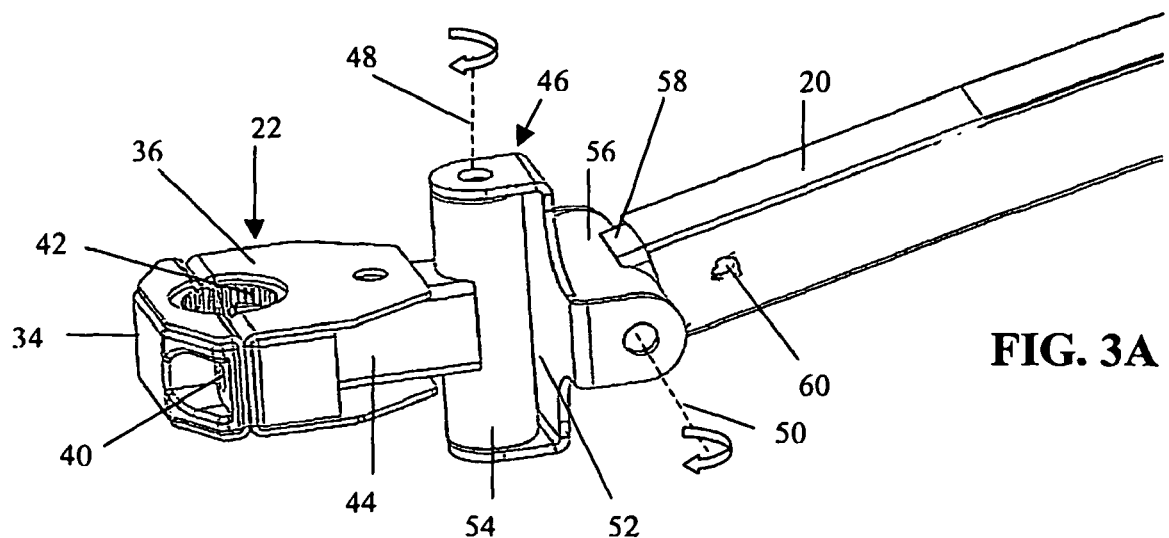
FIGS. 3A–3C are perspective, side and top views, respectively, of the bicycle towing device of FIG. 2.
Figure 3B:
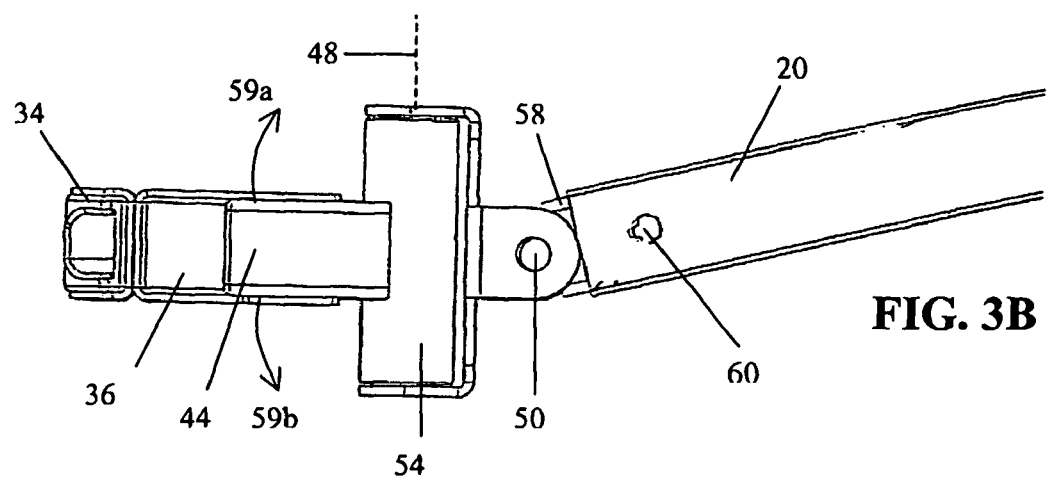
Figure 3C:
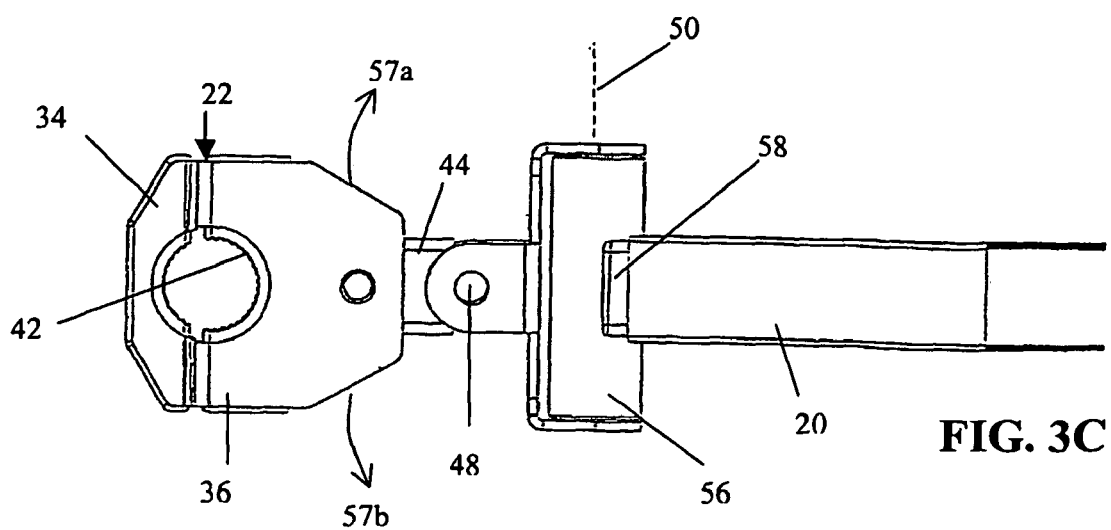

Referring now to FIGS. 3A–3C, various aspects of the leading bicycle connection 16 will be described in greater detail with reference to views of the leading bicycle connection 16 from various different views. The leading bicycle connection 16 includes a clamp 22 that is connectable to the seat post 24 or another portion of the leading bicycle 12. The clamp 22 includes a first clamping surface 34 and a second clamping surface 36 having a recess 38 located there between for accommodating the seat post 24 of the leading bicycle 12. The leading bicycle connection 16 is attached to the leading bicycle 12 by simply separating first clamping surface 34 and the second clamping surface 36, situating the seat post 24 within the recess 38 of the clamp 22, and fastening the first clamping surface 34 together with the second clamping surface 36, such as by bolting the first clamping surface 34 and the second clamping surface 36 together through apertures 40 in both surfaces 34, 36. Notwithstanding the above description, it is the intention of the inventor of the present invention that any type of clamp known to those skilled in the art could be utilized for the clamp 22 of the leading bicycle connection 16.

In another preferred embodiment of the bicycle towing device 10, the clamp 22 of the leading bicycle connection 16 may further include at least one interchangeable insert 42 to serve as the gripping surfaces of the first and second clamping surfaces 34, 36. By utilizing interchangeable inserts 42, the particular shape and size of the gripping surfaces of the clamp 22 can be variably selected by a user to provide the best attachment to the particular leading bicycle 12 being utilized. The interchangeable inserts 42 can also be formed to possess enhanced surface gripping characteristics, such a rubber coating or the like. The use of interchangeable inserts 42 allows the leading bicycle connection 16 to accommodate leading bicycles 12 having varied seat post 24 diameters. The use of interchangeable inserts 40 further allows the clamp 22 of the leading bicycle connection 16 to be attached to other portions of the rear frame of the leading bicycle 12 by selecting the interchangeable inserts 42 that most appropriately match the size of the particular portion of the rear frame of the leading bicycle 12 being attached to.

The leading bicycle connection 16 further includes an arm 44 extending from the clamp 22 to a bi-directional joint 46 that allows pivotal movement in only two pivotal directions. The bi-directional joint 46 allows rotation about two rotational axes 48 and 50, wherein any type of joint having only two rotation axes known to those skilled in the art may be utilized for the bi-directional joint 46. In the embodiment illustrated in FIGS. 3A–3C, the bi-directional joint 46 includes a bracket 52 that supports rotatable tubes or sleeves 54 and 56, such that rotatable sleeves 54, 56 are respectively rotatable about rotational axes 48, 50. The arm 44 is further connected to the rotatable sleeve 54 so as to allow the clamp 22 to pivot about rotational axis 48 in pivotal directions 57a, 57b. Another arm 58 is connected to the rotatable sleeve 56, wherein the tow bar 20 is attached to the arm 58. The tow bar 20 preferably possesses an inner cavity that receives and fits around the arm 58 until apertures 60 in the tow bar 20 and the arm 58 are aligned for receiving a bolt or pin (not shown) therein to attach the tow bar 20 to the arm 58. In this manner, the tow bar 20 can be simply attached and detached from the leading bicycle connection 16. Through this attachment of the tow bar to the arm 58, the clamp 22 is then rotatable with respect to the tow bar 20 about rotational axis 50 in directions 59a, 59b.

Figure 4:
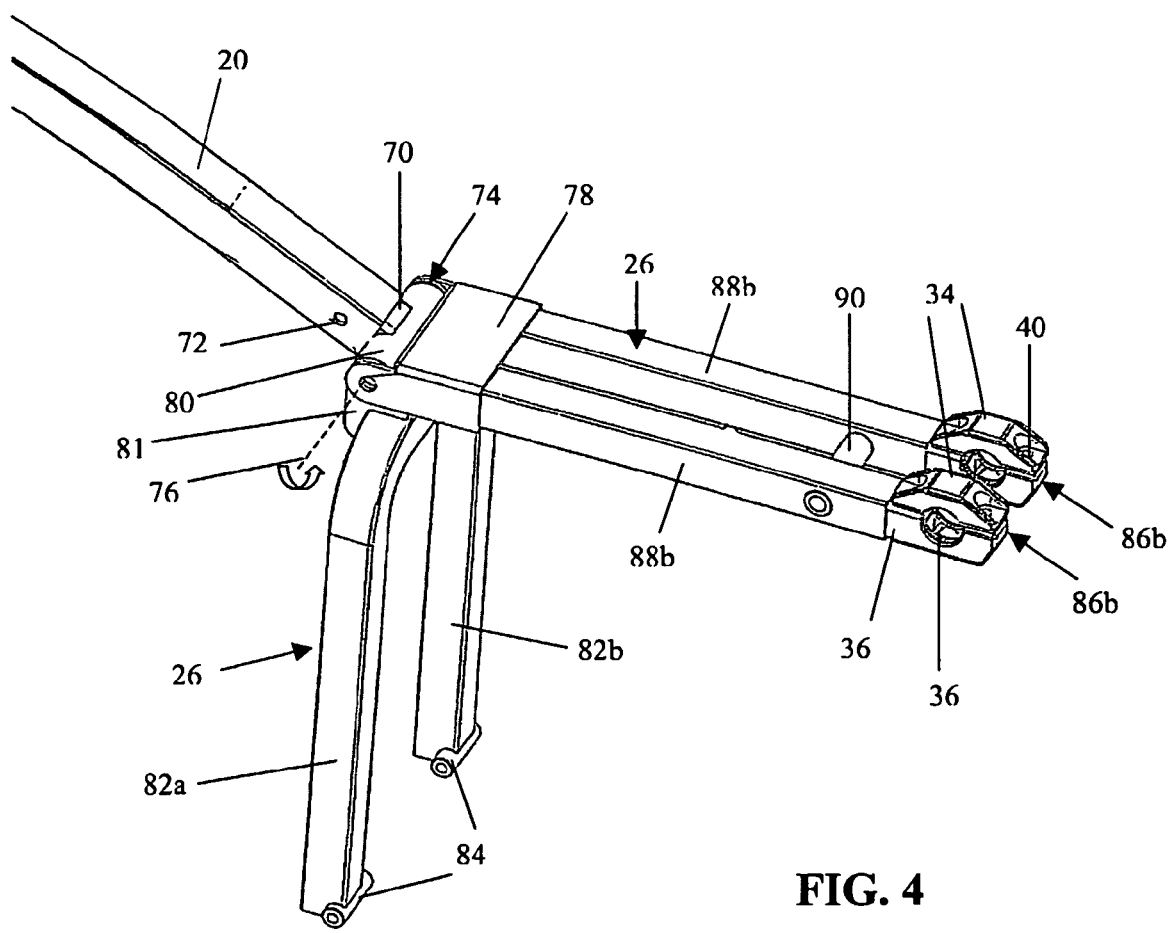
FIG. 4 is an enlarged, perspective view of the trailing bicycle connection of the bicycle towing device.

The tow bar 20 is also pivotally connected on its opposite end to a pivotal arm 70 on the trailing bicycle connection 18. Referring now to FIG. 4, an enlarged perspective view of the trailing bicycle connection 18 is illustrated. The pivotal arm 70 is attached to the tow bar 20 similarly as the arm 58 where the pivotal arm 70 is received within an inner cavity of the tow bar 20 until apertures 72 in the tow bar 20 and the pivotal arm 70 are aligned for receiving a bolt or pin (not shown) therein to attach the tow bar 20 to the pivotal arm 70. The pivotal arm 70 is further connected to a pivotal joint 74 that allows rotation about a rotational axis 76 with respect to the upper frame connection member 26 and the lower frame connection member 28 of the trailing bicycle connection 18. The pivotal joint 74 includes a rotatable tube or sleeve 80 that is rotatable about the rotational axis 76, wherein the pivotal arm 70 is attached to the a rotatable sleeve 80. A pivotal bracket 78 is also pivotally attached to the pivotal joint 74 to be pivotal about rotational axis 76, where the bracket 78 is rigidly connected to both the upper frame connection member 26. The upper frame connection member 26 is also rotatable about the rotational axis 76. The lower frame connection member 28 is further pivotally connected to the pivotal joint 74 to be pivotal about rotational axis 76. In this manner, the tow bar 20 is pivotally connected to both the leading bicycle connection 16 and the trailing bicycle connection 18. While the above-described embodiments have been set forth with reference to the figures, it is the intention that various other types of pivotal joints known to those skilled in the may be utilized as long as they limit the degrees of rotational movement to those described herein. Various modifications to the present invention may be easily made to position either one or both the pivotal joints 46 and 74 on the tow bar 20 itself instead of on the leading bicycle connection 16 and the trailing bicycle connection 18.

The lower frame connection member 28 of the trailing bicycle connection 18 includes a pivotal hinge 81 connected to a pair of spaced-apart members 82a, 82b that extend away from the pivotal joint 74. The spaced-apart members 82a, 82b may be formed as a single U-shaped member having an open end for accommodating the front wheel of the trailing bicycle 14 between the spaced-apart members 82a, 82b. Each of the spaced-apart members 82a, 82b includes a cylindrical bore 84 formed therein at the open end, wherein bolts (not shown) can be extended through each of the cylindrical bores 84 and further through respective openings positioned in the two legs of the front fork 86 of the trailing bicycle 16 in order to attach the lower frame connection member 28 to the trailing bicycle 16.

The upper frame connection member 26 of the trailing bicycle connection 18 may include a pair of spaced-apart bars 88a, 88b that extend in a substantially parallel direction away from the bracket 78 with a pair of clamps 86a, 86b respectively positioned at the end thereof, as shown in FIG. 4. Alternatively, a single bar (not shown) may extend away from the bracket 78 and ultimately fork at its end with the clamps 86a, 86b being respectively positioned at the end of each prong of the fork. In still further embodiments, the upper frame connection member 26 may comprise only a single bar having only a single clamp similar to clamps 86a, 86b positioned at its end. The spaced-apart clamps 86a, 86b are attachable to an upper portion of the trailing bicycle 16, preferably being attachable to the handlebar of the trailing bicycle 16. The clamps 86a, 86b are spaced apart a sufficient distance to enable the necks of most types of bicycles to be situated between the clamps 86a, 86b.

The clamps 86a, 86b are preferably formed to be substantially equivalent to the clamp 22 attachable to the leading bicycle 12, wherein the clamps 86a, 86b include a first clamping surface 34 and a second clamping surface 36 which form a recess 38 there between for accommodating the handlebar 30 of the trailing bicycle 14. To connect to the handlebar 30, the first clamping surface 34 is separated from the second clamping surface 36 and the handlebar 30 of the trailing bicycle 14 is situated within the recess 38 of the clamps 86a, 86b. The first clamping surface 34 is then attached to the second clamping surface 36, such as by bolting or similarly attaching the first clamping surface 34 and the second clamping surface 36 together through apertures 40 in both surfaces 34, 36. It is the intention of the inventor of the present invention that any type of clamp known to those skilled in the art could be utilized for the clamps 86a, 86b of the trailing bicycle connection 18. In the embodiment utilizing a pair of spaced-apart bars 88a, 88b, a support member or tube 90 may be positioned between the spaced-apart bars 88a, 88b at the end toward the clamps 86a, 86b to provide added stability and resist torsional rotation between the spaced-apart bars 88a, 88b.

The upper frame connection member 26 and the lower frame connection member 28 are both pivotal about rotational axis 76 in order to allow the trailing bicycle connection 18 to accommodate bicycles of varying sizes. In either order, once either the upper frame connection member 26 or the lower frame connection member 28 is connected to the trailing bicycle 14 as described above, the other component can be pivoted into its desired position to also be attached as described above. After the upper frame connection member 26 and the lower frame connection member 28 are attached to the trailing bicycle 14, these components are locked into their desired positioning and are no longer pivotal with respect to each other.

Once the upper frame connection member 26 and the lower frame connection member 28 are attached to respective points on the trailing bicycle 14, the trailing bicycle connection 18 will then move in unison with the front wheel of the trailing bicycle 14 in order to control movement of the trailing bicycle 14 while being towed. When the leading bicycle 12 and the trailing bicycle 14 are in their upright riding positions, the two pivotal joints 46 and 74 will allow rotation along respective rotational axes 50 and 76 in order to allow for difference in height between the leading bicycle 12 and the trailing bicycle 14, both during attachment and during actual towing operation. This pivotal movement ensures that the wheels of both bicycles 12, 14 remain on the ground at all times, and differences in height between the bicycles 12, 14 will not result in the bicycle towing device 10 lifting the front wheel of the trailing bicycle 14 off the ground. Some prior bicycle towing devices possessed an unsafe tendency to lift the front wheel of a trailing bicycle when there was a difference in height between attached bicycles. The further rotational axis 48 of the pivotal joint 46 allows the leading bicycle 12 to freely turn and pivot with respect to the tow bar 20 while causing the trailing bicycle 14 to turn in a similar manner as the leading bicycle 12 so that trailing bicycle 14 follows the movement of the leading bicycle 12.

When riding a bicycle, it is often necessary for a rider to lean on the bicycle to make it form an angle with respect to the ground in order to turn the bicycle. In order to maintain proper balance on the turning bicycle, the bicycle rider must lean into the direction of the turn. In order to ensure safe towing and to ensure both bicycles are traveling in a similar manner, the trailing bicycle 14 should lean at substantially the same angle as the leading bicycle 12 while being towed. By utilizing only two degrees of rotational movement between the clamp 22 and the tow bar 20 about the particular rotational axes 48, 50, any rotational torque imparted on bi-directional joint 46 by the clamp 22, for instance when the seat post 24 to which the clamp 22 is attached leans in a certain direction, will be substantially transferred to the tow bar 20. The tow bar 20 will transfer this rotational torque to the trailing bicycle connection 18, which basically only allows pivotal movement in an up and down direction by pivotal joint 74 to account for differences in height between the leading bicycle 12 and the trailing bicycle 14. Thus, the trailing bicycle connection 18 will, in turn, transfer the rotational torque onto the trailing bicycle 14, causing it to lean in substantially the same direction as the leading bicycle 12.

By only allowing the above-described pivotal movement between the components on the bicycle towing device 10 about rotation axes 48, 50, and 76, the trailing bicycle 14 is towed in more stable and more easily maneuverable manner by substantially maintaining the trailing bicycle 14 at the same angle with respect to the ground as the leading bicycle 12. When the leading bicycle 12 leans in a certain direction, the limited rotational movement of the bi-directional joint 46 and pivotal joint 74 will cause the tow bar 20 to lean together with the leading bicycle 12. In this manner, the trailing bicycle 14 is maintained at the same riding angle as the leading bicycle 12, which assists in keeping the trailing bicycle 14 in a stable riding position and keeps it from tipping over. This is especially important when the trailing bicycle 14 is being towed without a rider to assist in keeping it in an upright position. Further, by connecting to both upper and lower portions of the trailing bicycle 14, the center of gravity of the force pulling on the trailing bicycle 14 is centered on the trailing bicycle 14 to provide more stable maneuverability of the trailing bicycle 14. The connection to both upper and lower portions of the trailing bicycle 14 further allows the bicycle towing device 10 to assist in controlling the trailing bicycle to mimic and accurately follow the movement of the leading bicycle.

All of the attachable components of the bicycle towing device 10 are easily attachable to and removable from each other to simply assemble and disassemble the bicycle towing device 10. By simply removing the bolts or pins inserted into apertures 60 and 72, the tow bar 20 can be removed and the leading bicycle 12 can be disconnected from the trailing bicycle 14. When connected to their respective bicycles 12, 14 without having the tow bar 20 attached, the leading bicycle connection 16 and the trailing bicycle connection 18 do not respectively interfere with the individual usage of the leading bicycle 12 and the trailing bicycle 14 separate from one another. Thus, it is possible to leave the leading bicycle connection 16 attached to the leading bicycle 12 or to leave the trailing bicycle connection 18 attached to the trailing bicycle 14 when the two bicycles 12, 14 are not being used in a towed relationship. This can hasten the process of connecting the bicycle towing device 10 when the trailing bicycle 14 is frequently towed by the leading bicycle 12. The bicycle towing device 10 is preferably constructed of a lightweight, rigid metal material, such as aluminum or steel or the like, but may further be constructed of other lightweight materials, such as plastic, that are capable of maintaining its rigidity while towing the trailing bicycle 14 behind the leading bicycle 12.

As can be seen from the foregoing, a bicycle towing device 10 formed in accordance with the present invention provides a more stable arrangement for towing a trailing bicycle behind a leading bicycle than previous known towing devices. Moreover, the bicycle towing device 10 formed in accordance with the present invention can be simply and efficiently assembled and disassembled through the use of various simple attachment mechanisms.

The different structures of the bicycle towing device of the present invention are described separately in each of the above embodiments. However, it is the full intention of the inventors of the present invention that the separate aspects of each embodiment described herein may be combined with the other embodiments described herein. Those skilled in the art will appreciate that various adaptations and modifications of the just described preferred embodiment can be configured without departing from the scope and spirit of the invention. Therefore, it is to be understood that, within the scope of the appended claims, the invention may be practiced other than as specifically described herein.

What is claimed:

1. A bicycle towing device for towing a trailing bicycle behind a leading bicycle, comprising:
   a leading bicycle connection member connectable to a leading bicycle;
   a trailing bicycle connection member having an upper frame connection member and a lower frame connection member, said lower frame connection member being connectable to a front fork of said trailing bicycle and said upper frame connection member being connectable to a portion of said trailing bicycle above said front fork, wherein said upper frame connection member includes at least one clamp connectable to an upper portion of said trailing bicycle and a pair of clamps that are connectable to a handlebar of said trailing bycycle; and
   a tow bar interconnecting said leading bicycle connection member to said trailing bicycle connection member.

2. The bicycle towing device of claim 1, wherein said pair of clamps are spaced apart from each other to allow a neck of the trailing bicycle to fit there between.

3. The bicycle towing device of claim 2, wherein said upper frame connection member comprises a pair of spaced-apart bars, each of said bars having a respective one of said pair of clamps located at an end of each thereof.

4. The bicycle towing device of claim 2, wherein said upper frame connection member comprises a single bar extending away from said lower frame connection member that forks into two prongs with a respective one of said pair of clamps located at an end of each of said prongs.

5. The bicycle towing device of claim 1, wherein said lower frame connection member includes a pair of spaced-apart members that are spaced apart from each other to allow a front wheel of the trailing bicycle to fit there between, wherein each of said pair of spaced-apart members are connectable to respective portions of the front fork of the trailing bicycle.

6. The bicycle towing device of claim 1, wherein said leading bicycle connection member includes: a bi-directional joint allowing pivotal movement in two rotational directions; a pivotal arm pivotally connected to one side of said bi-directional joint, wherein said tow bar is removably attachable to said pivotal arm; and a clamp pivotally connected to another side of said bi-directional joint, wherein said clamp is connectable to said leading bicycle.

7. The bicycle towing device of claim 6, wherein said pivotal arm and said clamp are pivotal with respect to said bi-directional joint about different rotational axes.

8. The bicycle towing device of claim 6, wherein said clamp is connectable to a seat post of said leading bicycle.

9. The bicycle towing device of claim 6, wherein said clamp includes at least one interchangeable insert that provides a gripping surface for gripping the leading bicycle, wherein said at least one interchangeable insert is selectable from a plurality of possible inserts to provide a desired gripping surface to accommodate a portion of the leading bicycle to which the clamp is being attached.

10. The bicycle towing device of claim 1, wherein, when connected to said leading bicycle and said trailing bicycle, said bicycle towing device causes said trailing bicycle to lean at substantially the same angle as said leading bicycle at all times.

11. The bicycle towing device of claim 1, wherein said tow bar is removably attachable to said leading bicycle connection member and said trailing bicycle connection member.

12. A bicycle towing device for towing a trailing bicycle behind a leading bicycle, comprising:
    a leading bicycle connection member connectable to a leading bicycle;
    a trailing bicycle connection member having an upper frame connection member and a lower frame connection member, said lower frame connection member being connectable to a front fork of said trailing bicycle and said upper frame connection member being connectable to a portion of said trailing bicycle above said front fork, wherein said upper frame connection member includes at least one clamp connectable to an upper portion of said trailing bicycle, wherein each of said clamps includes at least one interchangeable insert that provides a gripping surface for gripping said trailing bicycle, and wherein said at least one interchangeable insert is selectable to provide a desired gripping surface to accommodate portion of said trailing bicycle to which the clamp is being attached; and
    a tow bar interconnecting said leading bicycle connection member to said trailing bicycle connection member.

13. A bicycle towing device for towing a trailing bicycle behind a leading bicycle, comprising:
- a leading bicycle connection member connectable to a leading bicycle;
- a trailing bicycle connection member having an upper frame connection member and a lower frame connection member, said lower frame connection member being connectable to a front fork of the trailing bicycle and said upper frame connection member being connectable to a portion of the trailing bicycle above said front fork, wherein said trailing bicycle connection further includes:
  - a pivotal arm; and
  - a pivotal joint attached to said pivotal arm, said pivotal joint further being attached to said lower frame connection member and said upper frame connection, wherein said pivotal joint allows said pivotal arm to rotate with respect to said lower frame connection member and said upper frame connection; and
- a tow bar interconnecting said leading bicycle connection member to said trailing bicycle connection member.

14. The bicycle towing device of claim 13, wherein said tow bar is removably attachable to said pivotal arm.

15. The bicycle towing device of claim 13, wherein said lower frame connection member and said upper frame connection are both pivotally attached to said pivotal joint.

16. A bicycle towing device for towing a trailing bicycle behind a leading bicycle, comprising:
- a first clamp connectable to a leading bicycle;
- a bi-directional pivotal joint connected to said first clamp including two axes of rotation that extend in substantially perpendicular directions;
- a tow bar having a first end and a second end, said first end of said tow bar being connected to said bi-directional joint, said first clamp being pivotal in two rotational directions with respect to said tow bar; and
- a trailing bicycle connection connectable to a trailing bicycle, wherein said trailing bicycle connection is further pivotally connected to said second end of said tow bar and includes an upper frame connection member and a lower frame connection member, said lower frame connection member being connectable to a front fork of said trailing bicycle and said upper frame connection member being connectable to a portion of said trailing bicycle above said front fork, wherein said upper frame connection member includes a pair of clamps that are connectable to a handlebar of said trailing bicycle, wherein said pair of clamps are spaced apart from each other to allow a neck of said trailing bicycle to fit there between.

17. The bicycle towing device of claim 16, wherein when connected to said leading bicycle and said trailing bicycle, said bicycle towing device causes said trailing bicycle to lean at substantially the same angle as said leading bicycle at all times.

18. The bicycle towing device of claim 16 wherein said tow bar is removably attachable to said bi-directional joint and said trailing bicycle connection member.

19. A bicycle towing device for towing a trailing bicycle behind a leading bicycle, comprising:
- a first clamp connectable to a leading bicycle;
- a bi-directional pivotal joint connected to said first clamp including two axes of rotation that extend in substantially perpendicular directions;
- a tow bar having a first end and a second end, said first end of said tow bar being connected to said bi-directional joint, said first clamp being pivotal in two rotational directions with respect to said tow bar; and
- a trailing bicycle connection connectable to a trailing bicycle, wherein said trailing bicycle connection is further pivotally connected to said second end of said tow bar and includes an upper frame connection member and a lower frame connection member, said lower frame connection member being connectable to a front fork of said trailing bicycle and said upper frame connection member being connectable to a portion of said trailing bicycle above said front fork, wherein said upper frame connection member comprises a pair of spaced-apart bars, each of said bars having a respective one of said pair of clamps located at an end of each thereof.

* * * * *